United States Patent
Ross, Jr.

[11] Patent Number: 5,815,187
[45] Date of Patent: Sep. 29, 1998

[54] METHOD FOR IMPROVING THE DIMENSIONAL ACCURACY OF LASER PRINTERS

[75] Inventor: Robert C. Ross, Jr., Daphne, Ala.

[73] Assignee: Xante Corporation, Mobile, Ala.

[21] Appl. No.: 628,492

[22] Filed: Apr. 5, 1996

Related U.S. Application Data

[63] Continuation-in-part of Ser. No. 584,004, Jan. 11, 1996.

[51] Int. Cl.$^6$ ..................................................... B41J 2/385
[52] U.S. Cl. .......................... 347/131; 358/298; 358/406; 358/451
[58] Field of Search ........................... 347/131; 358/298, 358/406, 448, 451, 474; 399/72

[56] References Cited

U.S. PATENT DOCUMENTS

| | | | |
|---|---|---|---|
| 4,572,653 | 2/1986 | Ito et al. | 399/74 |
| 4,724,330 | 2/1988 | Tuhro | 358/406 |
| 5,128,699 | 7/1992 | Nakajima et al. | 358/298 |
| 5,250,939 | 10/1993 | Yamada et al. | 358/298 |
| 5,291,221 | 3/1994 | Sanger et al. | 347/234 |
| 5,321,432 | 6/1994 | Ishikawa et al. | 358/298 |
| 5,325,122 | 6/1994 | Hattori et al. | 347/131 |
| 5,359,434 | 10/1994 | Nakao et al. | 358/481 |
| 5,408,329 | 4/1995 | Mailloux et al. | 347/131 |
| 5,481,340 | 1/1996 | Nagao et al. | 399/72 |
| 5,642,202 | 6/1997 | Williams et al. | 358/406 |

Primary Examiner—Jeffrey L. Sterrett
Attorney, Agent, or Firm—Lane, Aitken & McCann

[57] ABSTRACT

A method that changes the image length and width produced by a laser printer to bring the printer's printed output into exact dimensional accuracy with the data input. This is accomplished by first a measuring sample page produced by the printer in response to a known input. Errors, if any, are measured and fed back into the printer through a host computer, and the graphics controller uses this information to change the printed graphics in the vertical and horizontal dimensions. In one embodiment of the invention, the graphic depiction is scaled as it is converted from the display list to the dot image in the printers RAM. In another embodiment, the resolution of the controller is changed to compensate for errors.

9 Claims, 8 Drawing Sheets

METHOD FOR IMPROVING THE DIMENSIONAL ACCURACY OF LASER PRINTERS

CROSS REFERENCE TO RELATED APPLICATION

This is a continuation-in-part of application Ser. No. 08/584,004, of Robert C. Ross, Jr., entitled A Method For Improving The Dimensional Accuracy Of Laser Printers, filed Jan. 11, 1996.

BACKGROUND OF THE INVENTION

1. Field of the Invention

This invention relates to a system and method for improving the dimensional accuracy of graphic material printed by a laser printer and other similar printer technologies.

2. Description of the Prior Art

There are two basic components of a commercial laser printer, a graphics controller and a print engine. Electrophotographic print engines, typically referred to as laser print engines, are designed to create an image by printing a series of dots on a print medium, typically paper. This image is created by a highly focused light source which is scanned at a specific rate across a charged surface of photosensitive material, typically referred to as the drum. This light source is modulated such that some areas are exposed and some are not, creating a predetermined pattern on the photosensitive material. The areas sensitized by the light source cause the material to bear a charge pattern corresponding to the desired image to be printed. The final printed material is created by the attraction of toner particles to the sensitized areas of photosensitive material and then transferring this toner to the print media.

Due to the many components involved in the print process and the manufacturing tolerance of each component, no two laser printer engines produce an output of exactly the same horizontal and vertical dimensions in response to a given input.

The majority of electrophotographic print engines are developed by a few large manufacturers, e.g. Canon, Fuji-Xerox, Lexmark, Minolta, and Toshiba, and require the addition of a graphics controller, which describes, in an electronic form, the page to be printed on the marking engine. The graphics controller is digitally controlled and, therefore, can produce images at the accuracy of the resolution of the print engine, i.e. 1200 dots per inch (dpi) or $\frac{1}{1200}$ of an inch accuracy. However, the print engine is a mechanical device, which typically is much more inaccurate than digital electronics. Typical print engines have an accuracy of plus or minus 1% or $\frac{12}{1200}$ inch for a 1200 dpi printer.

In electrophotographic printers, a graphics controller creates in RAM an image of the page to be printed at the resolution of the marking engine with one bit in the RAM image representing one dot of the laser printer. Once the image is built, the graphics controller then communicates with an electromechanical controller which is part of the print engine to control the electromechanical aspects of the marking engine. This electromechanical controller, typically called the DC controller, among other tasks, has primary control of two key elements of the engine, the main motor and laser scanner motor. The main motor is responsible for all media movement of the marking engine. The laser scanner is responsible for spinning the rotating mirror used to reflect the laser beam and therefore scan the laser beam across the moving photosensitive drum. Both motors, the main and scanner motors, are stepper motors. That is, motors in which their speed is controlled by crystal timing components.

When the graphic controller communicates to the DC controller to start the printing process, the DC controller then starts the main and laser scanner stepper motors, which run at the rates specified by their separate timing crystals. Through a series of gears and clutches, paper movement now begins at the speed controlled by the main stepper motor. This digital image of the page is then transferred to the light sensitive drum from the graphics controller. The rate at which this transfer takes place is proportional to the rated speed of the marking engine. The laser charged portion of the drum rotates through a toner bin and toner is attracted to the charged area of the drum. Toner is transferred to paper (or other media as appropriate) when toner is attracted to a highly charged roller located behind the media and intercepted by the media. The media is then heated by a fusing roller and toner is melted into the paper. The rate at which this process takes place is defined by the inversion of the rated page-per-minute rate of the marking engine. For example, a 16 page-per-minute printer would have a one page print time of 3.75 seconds. The rated speed of the engine is typically fixed by the print engine manufacturer.

Print engine manufacture's released specifications as to the print image accuracy tolerances for both the horizontal and vertical directions. For example, the Canon BX2 laser print engine has a vertical and horizontal inaccuracy of plus or minus 1% or $\frac{1}{4}$ inch over its maximum 25 inch page. The Toshiba TN-7270 specifies an inaccuracy of plus or minus 1% in the horizontal direction and 0.85% in the vertical direction.

In order to be cost effective, laser printer engines are developed for mass production; typically 50,000 units or more. To improve the dimensional accuracy with which a page is printed in accordance with prior art approaches to improving dimensional accuracy would require tightening the manufacturing tolerances of the print engine. This situation would require longer production lead-times and higher cost, since the components would have to be produced with higher cost materials to extremely tight tolerances. Testing for these tight tolerances would also cause higher manufacturing fallout and greater labor costs due to this increased test time.

SUMMARY OF THE INVENTION

An object of this invention is to improve the accuracy of the marking engine in combination with its graphics controller, either resident in the printer or in the host computer, to tolerances within the size of one dot of the resolution of the laser printer.

Another object is to provide a method that allows a user to readjust the accuracy as the characteristics of the print engine change due to wear and tear.

Briefly, this invention contemplates a method in which test lines in both the vertical and horizontal direction are printed in response to a known input. The actual measured length of the lines is entered in the printer's graphics controller, an error amount is determined, and future pages are corrected in both directions independently in order to compensate for the print engine inaccuracy.

In one specific embodiment of the invention, the error in each direction is converted to an error correcting scale factor. This factor is inserted in the scale matrix. The scale matrix is used in existing graphics controllers to make user inputted adjustments, if any, in the scale of the printed page.

The graphics controller uses the scale matrix in converting the display list to a bit pattern in the RAM. In another embodiment of the invention, the calculated error in each direction is used to change the resolution of the controller; that is, the resolution of the controller (usually expressed in dots per inch) is changed so that controller resolution and the print engine resolutions are synchronized.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT

Referring to FIGS. 1, 2, 3, 4, 5 and 6, the present invention is described as applied to an electrophotographic printer, such as a laser beam printer, although it should be understood that the present invention is compatible with other forms of intelligent printers which include LED, dot matrix, ink jet, or any other form of printer that uses a bit image in to create the final output page. The present invention is also described with a printer resident graphics controller, although it should be understood that the present invention also applies to printers with non-resident graphics controllers, including graphics controllers which reside as a software based controller running on a host computer's hardware, a hardware based graphics controller residing inside the case of the host computer, or a graphics controller located outside the printer housing.

In an electrophotographic printing, an image is first created on a main computer 1. The user of this computer installs the correct printer driver software (e.g. PostScript®) which software matches the printing capability of the desired printer to the host software. During printing operation, the printer driver software converts an image desired to be printed into a language understandable by the controller of the printing device. This data is then transferred to an intelligent graphics controller 2, typically residing in the printer. From this transferred data, the graphics controller 2 creates an exact image of the page to be printed in its DRAM 15, shown in FIG. 2.

Figure 1:
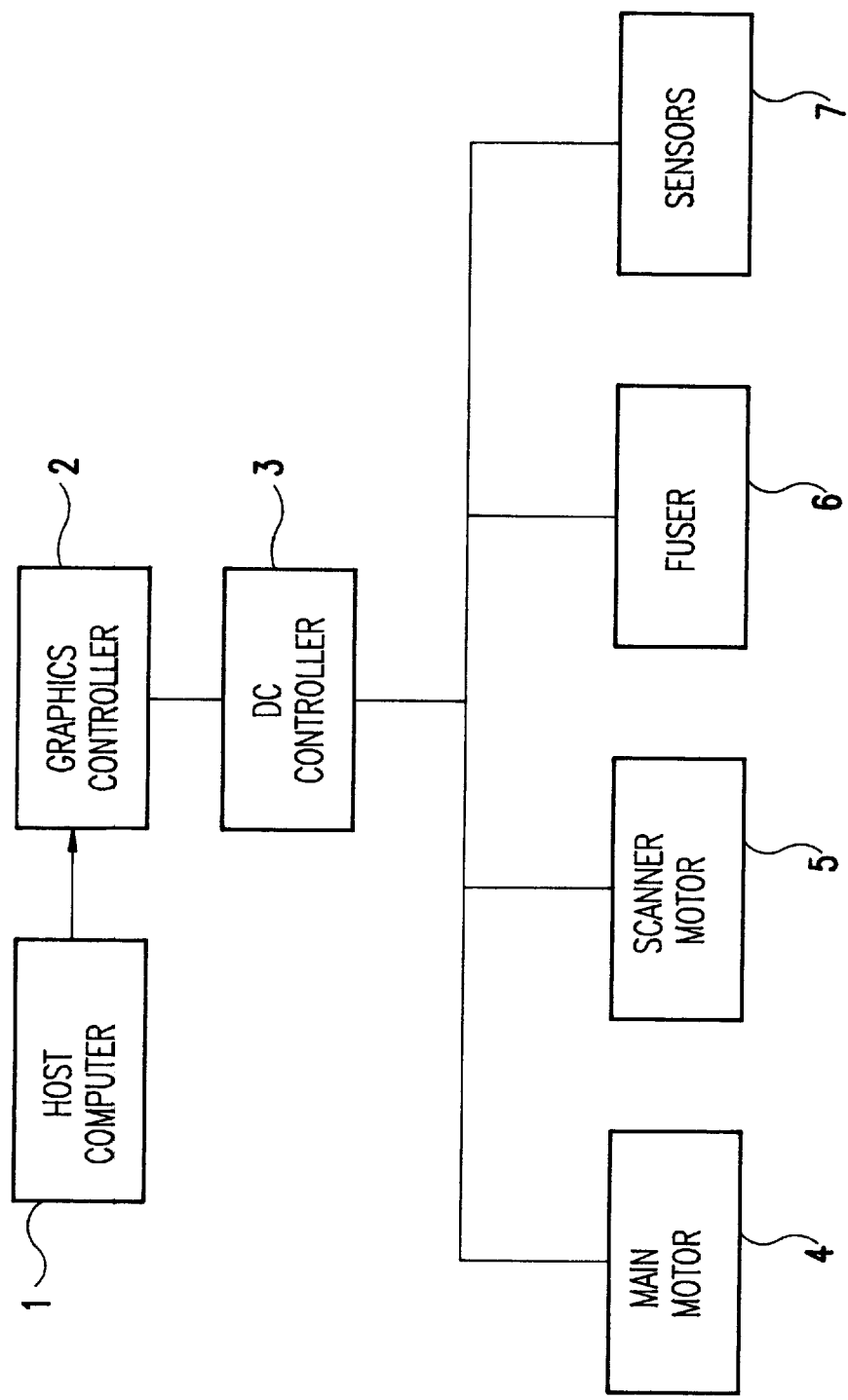
FIG. 1 is a printer overview block diagram.
Figure 2:
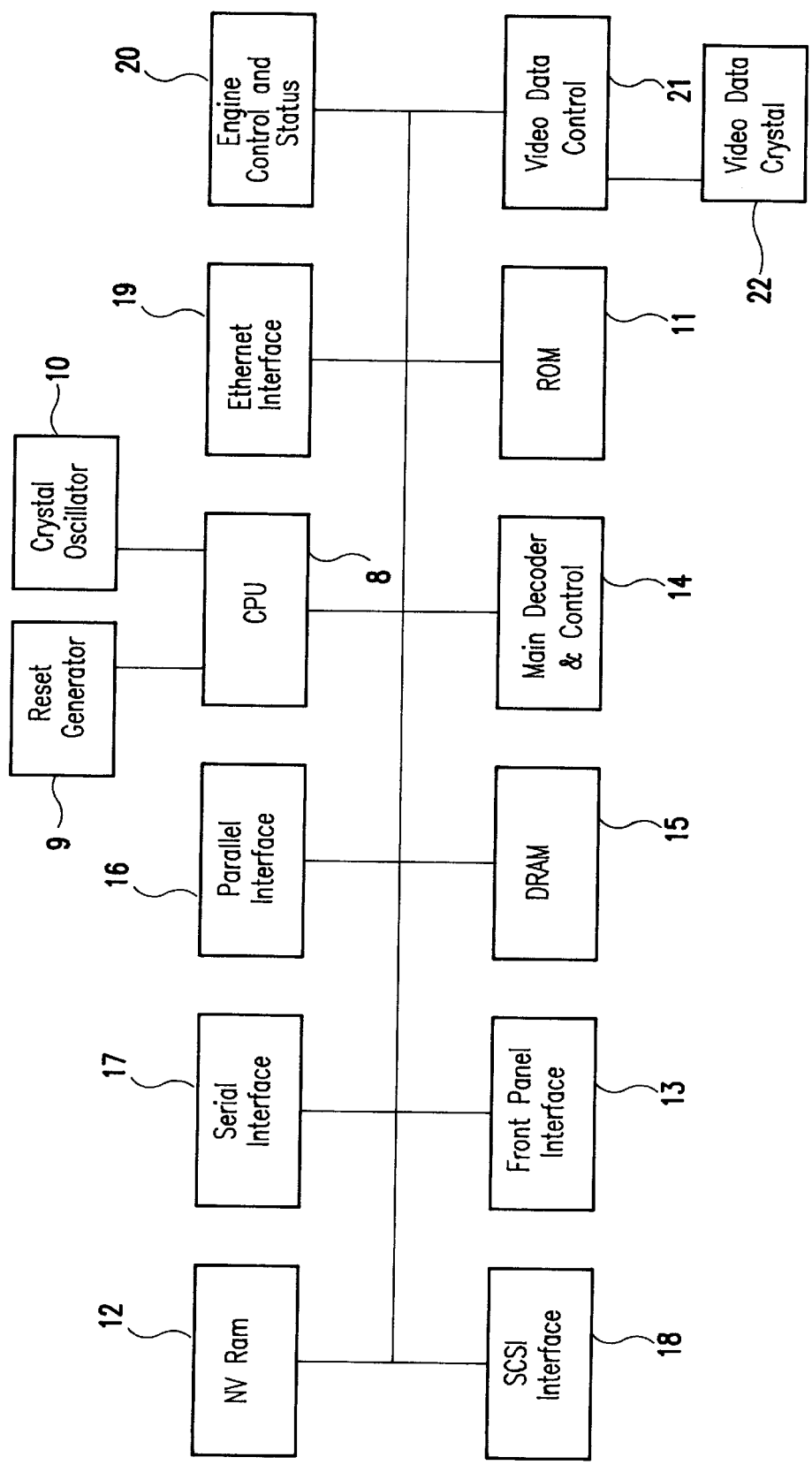
FIG. 2 is a graphics controller overview block diagram.

The graphics controller 2 has three main functions: 1) receipt of the data from the host computer over a specified interface, 2) interpretation of this data into an electronic image representing the page to be printed, and 3) transfer of this image data to a marking engine. Referring now to FIG. 2, the graphics controller is controlled by a CPU 8. The CPU 8 receives its reset from a reset generator 9. The CPU 8 receives its clock from the CPU crystal oscillator 10. The CPU 8 itself is, for example, a 32 bit microprocessor that executes instructions stored in ROM 11. The ROM 11 is used to store CPU 8 instructions, data for creating characters, and data for interpreting information coming from the host computer. The graphics controller 2 also contains a non-volatile RAM, NVRAM 12, which is used to store page count and setup information specified by the user without being erased by loss of power. A front panel interface 13 is used to communicate with an LCD module (not shown) for displaying printer status and with button keys (not shown) used to input setup information into the graphics controller. A main decoder and control 14 determines the peripheral circuit to be accessed during a CPU 8 execution cycle and supplies the control signal for the specific timing characteristics required by each peripheral.

The DRAM 15 is used by the CPU 8 to store information about the current execution parameters of the CPU 8, store incoming data from the host computer and store a bit mapped image of the page being created and printed. A parallel interface 16 controls the transfer of data from the host computer to the graphics controller over this interface. A serial interface 17 controls the transfer of data between the graphics controller 2 and the host computer 1 when the host computer desires to send data serially. A SCSI interface 18 is used to control hard disks for permanent storage of fonts from the host computer and as an extension of the main DRAM 15 memory, although the hard disk is slower and is only used when DRAM 15 space is exhausted. An ethernet interface 19 is used to control data from the host computer when transfer is desired over an ethernet network. An engine control and status circuit 20 is responsible for bi-directional communications with the DC controller 3 shown in FIG. 5. A video data control circuit 21 is responsible for the proper generation and timing of image data as the data is transferred to a DC controller 3 during page printing. The rate at which image data is transferred is specified by the clock rate of a video clock crystal 22.

Figure 5:
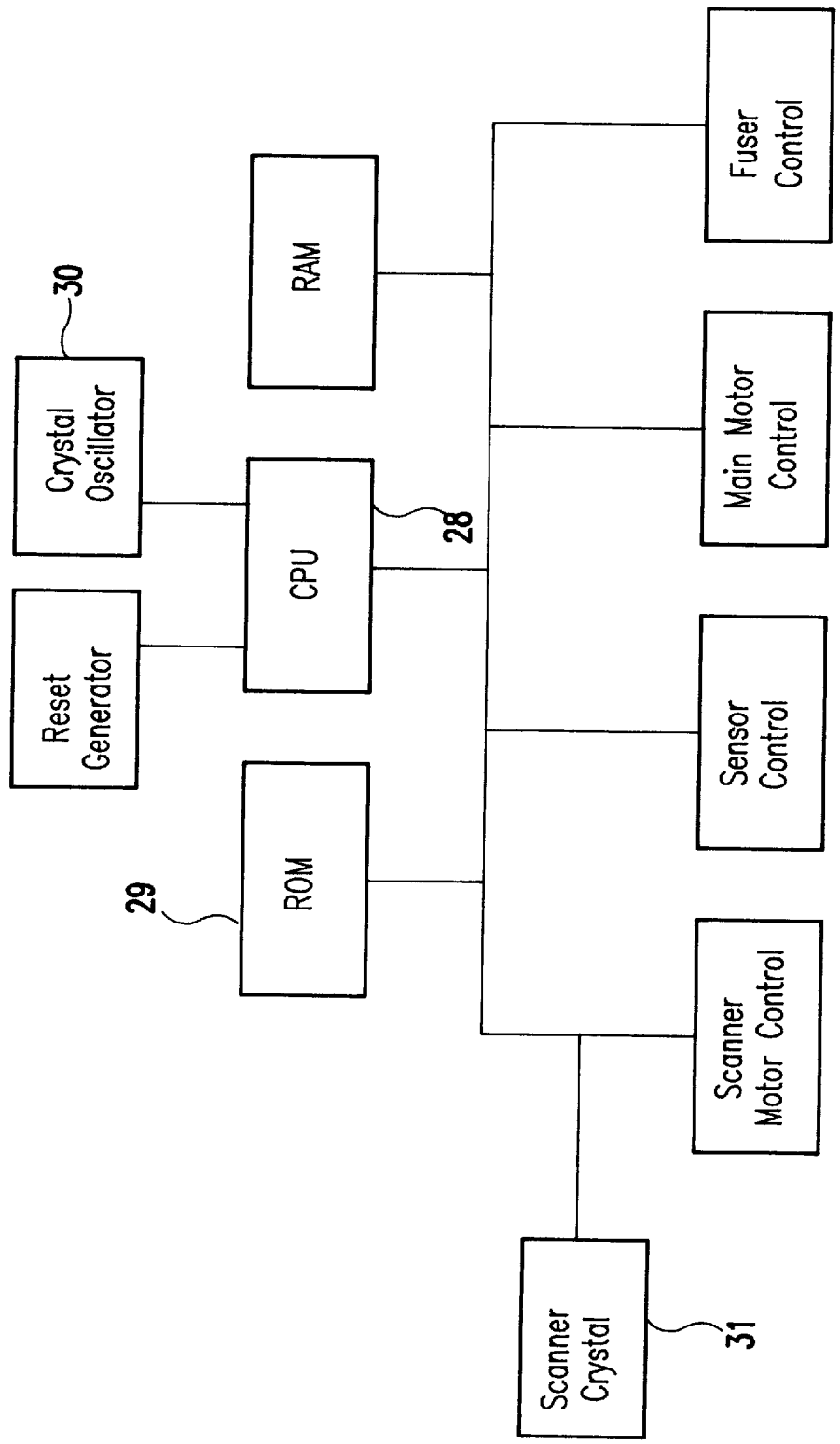
FIG. 5 is a DC controller overview block diagram.
Figure 6:
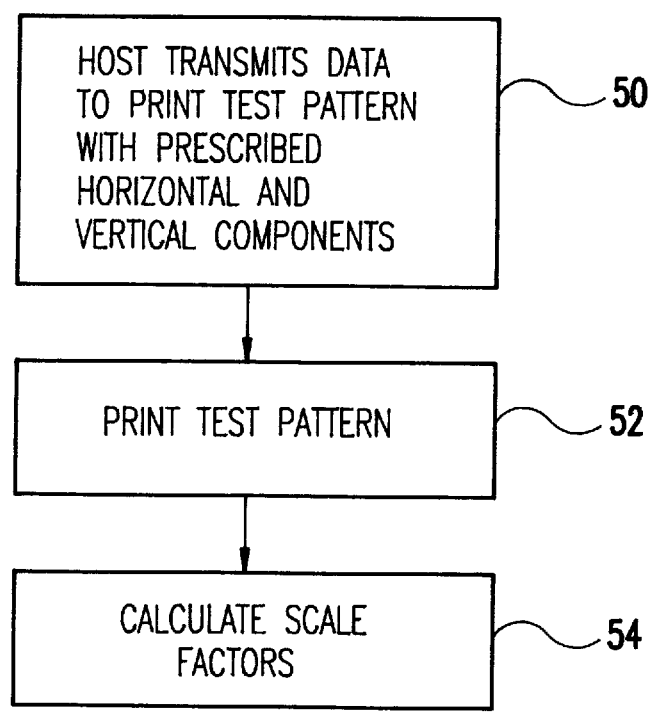
FIG. 6 is a bit map image before and after sample calibration.
Figure 7:
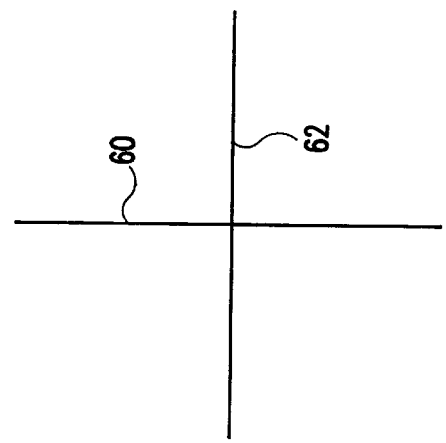
FIG. 7 is a test pattern example.

Once the graphics controller creates a dot image of the page in the DRAM 15, the graphics controller 2 communicates with a second controller 3 located inside the printer that is ready to begin printing. Referring now to FIG. 5, this second controller 3, typically called a DC controller, is responsible for controlling a main paper drive and driver motor 4, a laser scanner motor 5, a fuser 6, and sensors 7 reporting all error detection such as paper jams, paper sizes, optional trays, fusing temperature, etc.

In response to DC controller 3 signals, the main motor 4 and scanner motor 5 to begin to rotate. At this time the entire surface of an electrostatic drum 26 is being cleaned and recharged. The cleaning is accomplished by the application of a rubber cleaning blade 33 which scrapes the surface of the drum 26, removing any leftover toner particles. The surface of the drum 26 is also electrostatically cleaned by an erasing charge, usually an electromagnetic field of several hundred volts. After the proper speed and paper movement have been detected by the DC controller 3, it notifies the graphics controller it is ready to begin imaging the page. The graphics controller 2 begins transferring the data, typically referred to as video data, in a serial stream of one line increments at a predetermined rate proportional to that of the speed of the laser printer. At the same time the DC controller 3 passes this video data to a laser 23, pulsing the laser 23 on and off corresponding to the DRAM 15 image of the page being printed.

Figure 3:
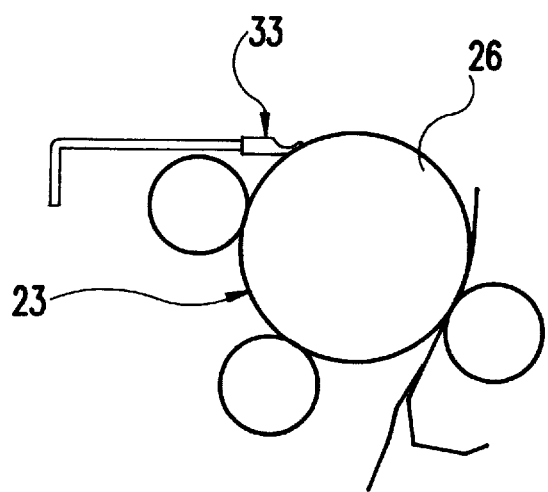
FIG. 3 is a print engine overview block diagram.
Figure 4:
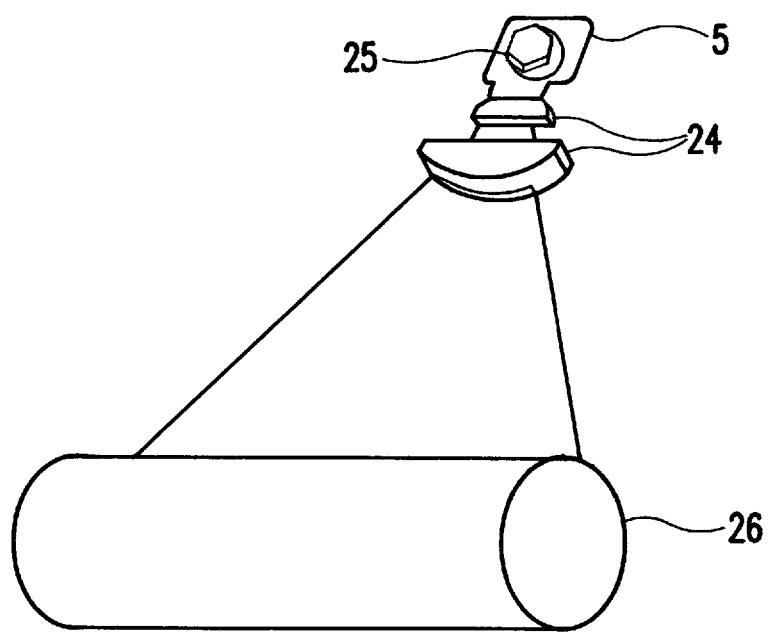
FIG. 4 is a scanner motor assembly schematic.

Referring to FIGS. 3 and 4, a laser beam 23 is produced by a solid state laser which is turned on and off by supplying or denying power. The light produced by the laser is then highly focused by a collimator lens 24 from a rotating mirror 25 atop the scanner motor 5. This rotating mirror 25 is a six-sided rotating polygon mirror whose purpose is to sweep a highly focused laser beam 23 across the surface of the photosensitive cylindrical drum 26. Areas of the drum not charged by the laser beam 23 remain at a potential of negative 600 volts. Areas charged by the laser beam 23 are now at negative 100 volts.

During this printing process the DC controller 3 also monitors sensors 7 inside the printer which track paper movement. The DC controller 3 is preprogrammed with information about the speed of the engine and which sensors 7 should detect paper at which time in the printing process. If these sensors 7 do not report paper detection in the proper timeframe proportional to that of the speed of the printer, the DC controller 3 stops the main motor 4 and scanner motor 5 movement and reports an error to the graphics controller 2.

Assuming no errors are detected in the printing process the laser beam 23 images an exact replica of the desired printed output onto the surface of the electrophotographic drum 26. This drum 26 is rotating at the exact rate of the paper, being that the main motor 4 controls both their movement.

The drum 26 rotates at the rate controlled by the main motor 4 through what is known as developer 27. The developer 27 material, called toner, adheres to the areas of the drum 26 currently at negative 100 volts potential and not the negative 600 volt areas. The toner is a black plastic resin ground to between 6 and 12 microns in size and is bound to iron particles. The iron particles are attracted to a rotating cylindrical magnet located inside the developer 27 unit. The toner particles obtain a negative charge by contacting this cylinder which is connected to a negative DC supply. This negative charge of the toner particles causes them to attract to the areas of the drum exposed by the laser beam 23.

The paper, which is traveling at the same speed as the electrophotographic drum 26, contacts the surface of the drum 26. A transfer charging roller 34 produces a strong positive charge onto the back side of the paper as it is moving across the drum 26. This stronger positive charge pulls the toner from the drum 26 and onto the paper. The paper moves to the fuser 6. A Teflon drum is preheated to 360° F. by an internal heating lamp controlled by the DC controller 3, and rotates at the same speed as the paper and drum 26, and melts and forces the toner into the paper with the force of a soft back roller.

The DC controller 3 is responsible for controlling all of the electromechanical functions of the laser printer. It contains a central processing unit (CPU 28), which is controlled by crystal timing, read-only memory (ROM 29), sensors 7 which detect engine functions, and control signals which drive the scanner motor 5, main motor 4, and laser beam 23.

Referring now to FIGS. 6, 7, 8 and 9, in a specific embodiment of the invention, the printer is a Canon LBP-BX2 16 page-per-minute laser printer, integrated with a graphics controller 2, and sold under the name Accel-a-Writer® 8200 by Xante® Corporation at 2559 Emogene Street Mobile, Ala. 36606, the assignee of this application. In one example, prior to calibration or recalibration of the printer, the host processor 1 transmits data (block 50, FIG. 6) to the print controller 2 to print test pattern shown in FIG. 7. The test pattern is printed, block 52. This test pattern has a vertical leg 60 with length prescribed by the print controller, as a result of the host input, of eight (8) inches and a horizontal leg 62 with a print controller prescribed length also of eight (8) inches. In this example, due to a build-up of manufacturing tolerances in the printing system engine, the actual measured length of the printed vertical leg 60 is 7.9700 and the actual measured length of the printed horizontal leg 62 is 8.0040 inches.

In block 54, scale factors are calculated to compensate for the mechanical inaccuracy of the printer.

8.000/8.0040=0.999502 horizontal scale factor 8.000/7.9700=1.00376 vertical scale As indicated in block 54, the scale factors (Px and Py) are stored in the non-volatile NVRAM 12. In this specific example, the scale factors are calculated and are fed to the printer through host based software by the following PostScript® software commands.

```
/XanteProcs
/ProcSet findresource
begin
8.000 8.004 div 8.000 7.970 div   setprecisionline
end
```

The graphics controller 2 interprets these software commands and stores the values 0.999502 and 1.00376 in non-volatile NVRAM 12.

Figure 8:
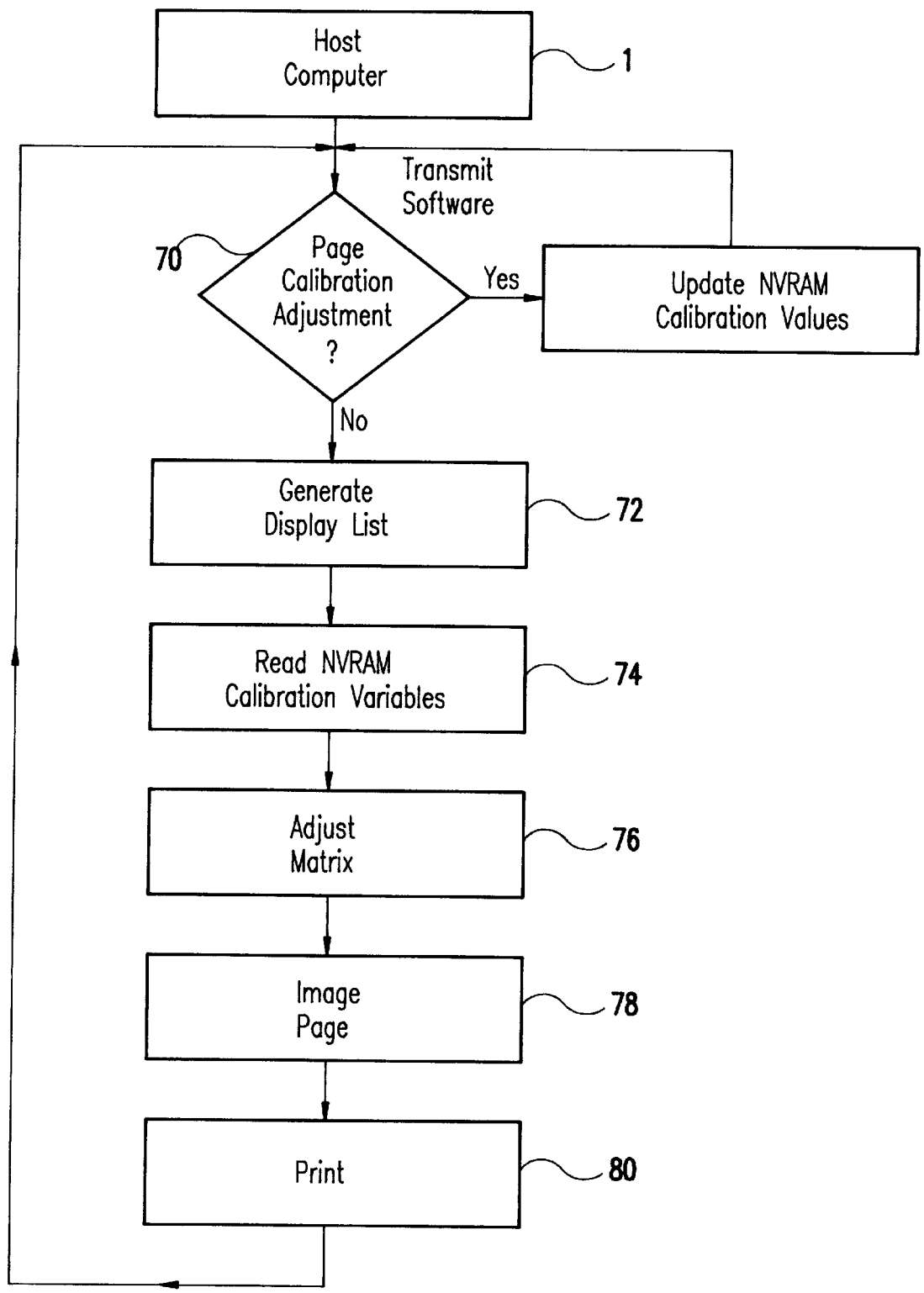
FIG. 8 is a flow chart of one aspect of the method of the invention.

Referring now to FIG. 8, in printing a page after the scale factors have been stored in NVRAM 12, the host computer 1 checks for page calibration adjustments in decision box 70. If there are no adjustments to the NVRAM calibration values, the host computer 1 sends a series of software commands (e.g. PostScript commands) to the graphics controller 2 in order to create the page to be printed. The graphics controller 2 arranges these commands, which are used to create the dot image of the page in DRAM 15, in display list, block 72. As will be appreciated by those skilled in the art, in block 74, the graphics controller 2 receives parameters which describe the scale, rotation and transformation of the page to be printed. The scale, rotation and transformation factors can each be respectively described in a 3×3 matrix. In exemplary commercially available printers, the 3×3 matrix:

$$\begin{bmatrix} Sx & 0 & 0 \\ 0 & Sy & 0 \\ 0 & 0 & 1 \end{bmatrix}$$

is used to by the graphics controller to alter the scale of the dot image of the page stored in DRAM 15, where a parameter Sx is the matrix variable which describes the scale factor in the horizontal direction and a parameter Sy is the matrix variable which describes the scale factor in the vertical direction. In accordance with the teaching of this invention, in block 76, the correction factor Px for the horizontal direction and Py for the vertical direction (stored in NVRAM 12) are used as multiples of the scale parameters Sx and Sy, respectively, in the scale matrix, namely:

$$\begin{bmatrix} Sx*Px & 0 & 0 \\ 0 & Sy*Py & 0 \\ 0 & 0 & 1 \end{bmatrix}$$

Figure 9:
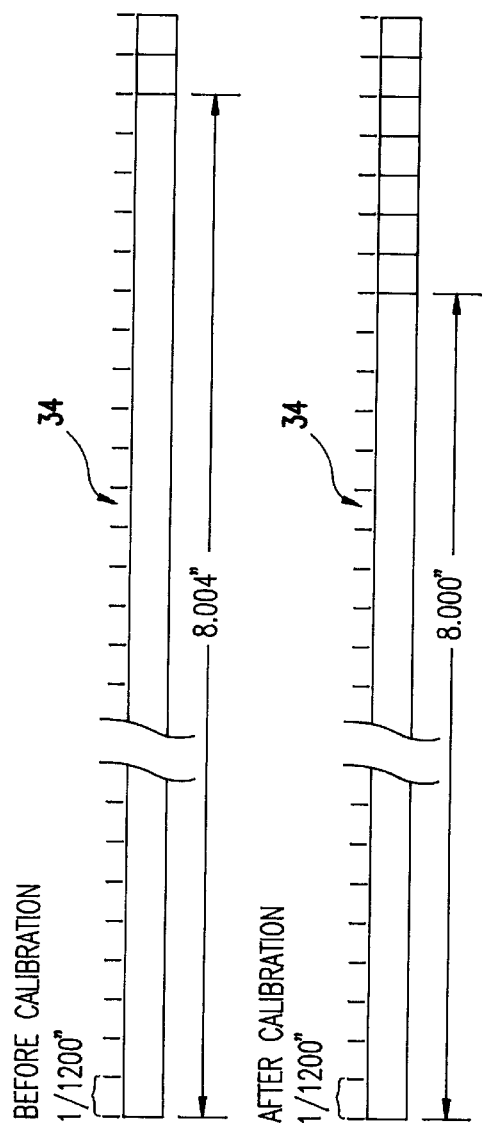
FIG. 9 is a flow chart of another aspect of the method of the invention.

In block 78, the graphics controller 2 generates a dot position image matrix in DRAM 15 from the display list, using the same processing algorithms as in the prior art, but using the scale matrix that includes the correction factors Px and Py. All pages (until recalibrated) are scaled, at the time of dot image creation in the DRAM 15 of the graphics controller 2, by a factor of 99.9502% in the vertical direction and by a factor of 100.3760% in the horizontal direction, and then printed, as indicated at block 80. FIG. 9 compares the accuracy of a printed horizontal line with and without the error correction scale factor of the invention.

In the alternate embodiment of the invention print engine errors are compensated by changing the controller resolution in terms of bits per inch stored in the RAM so that the controller resolution is the same as the print engine resolution. The print engine errors are first determined in the same manner as explained in connection with FIG. 7. Using the example discussed in connection with FIG. 7, the horizontal error is plus 0.0040 inches in an eight inch line and the vertical error is minus 0.0300 inches in an eight inch line. A horizontal and vertical correction factor is calculated. This factor is simply the measured error in each direction expressed as a fraction of the intended line length; in this example, the horizontal correction factor is plus 0.0005 and the vertical correction factor is minus 0.0039. Assuming a controller with a 1200 dots per inch resolution, the controller resolution is changed so that its resolution corresponds to the measured resolution of the print engine. In this example, the horizontal resolution is changed by the factor plus 0.0005 to 1200.6 dots per inch and the vertical resolution is changed by the factor minimum 0.0039 to 1194.32 dots per inch. The postscript commands to change the controller resolution are:

<</HWResolution[1201 1194]>>setsystemparams

To provide a comparison of the two embodiments of the invention for correcting print engine errors for illustrative purposes, the programmed size of the printed page width is assumed to be two inches across, and the uncorrected controller resolution is five dots per inch. A horizontal line, nominally one inch long, is measured to be 0.8 inches long before calibration (i.e. a 20% error). The controller resolution remains five dots per inch, but six dot positions are mapped into the RAM because the line length is scaled to 5.2 inches. It should be noted that since the controller resolution remains five dots per inch, the maximum line length that can be printed with a scale factor of 20% on a programmed page two inches across. That is, a two inch line would be scaled to 2.4 inches, which would appear to the controller to exceed the programmed maximum width of a printed page and would not be printed.

If the resolution of the controller is increased by 20% to compensate for the engine error, a one inch line is bit mapped into the RAM as six dots, since the controller resolution has been changed to six dots per inch. Thus, again, the printed line will measure one inch. At the same time a two inch line will be bit mapped as twelve dots so that when printed it will measure two inches, and it will be printed, since it is within the programmed maximum line width.

While the invention has been described in terms of a single preferred embodiment, those skilled in the art will recognize that the invention can be practiced with modification within the spirit and scope of the appended claims.

What is claimed is:

1. A method for correcting horizontal and vertical scanning errors in a scanning printer in which a controller converts display list inputs to a stored map of data bit positions indicating where corresponding dots are to be printed including the steps of:

printing a pattern with said scanning printer by inputting to said scanning printer data for printing a pattern with horizontal component of a prescribed horizontal length and a vertical component of a prescribed vertical length;

determining the actual length of said horizontal component and the actual length of said vertical component printed in said printing step;

calculating a horizontal correction factor as a function of said prescribed horizontal length and said actual length of said horizontal component;

calculating a vertical correction factor as function of said prescribed vertical length and said actual length of said vertical component;

determining a number of bit positions to be stored in said map of bit positions in response to a display list input using a factor proportional to said horizontal correction factor and said vertical correction factor.

2. A method for correcting horizontal scanning errors in a scanning printer in which a controller converts display list inputs to a stored map of data bit positions indicating where corresponding dots are to be printed including the steps of:

printing a pattern with said scanning printer by inputting to said scanning printer data for printing a pattern with horizontal component of a prescribed horizontal length;

determining the actual length of said horizontal component printed in said printing step;

calculating a horizontal correction factor as a function of said prescribed horizontal length and said actual length of said horizontal component;

determining a number of bit positions to be stored in said map of bit positions in response to a display list input using a factor proportional to said horizontal correction factor.

3. A method for correcting vertical scanning errors in a scanning printer in which a controller converts display list inputs to a stored map of data bit positions indicating where corresponding dots are to be printed including the steps of:

printing a pattern with said scanning printer by inputting to said scanning printer data for printing a pattern with vertical component of a prescribed vertical length;

determining the actual length of said vertical component printed in said printing step;

calculating a vertical correction factor as a function of said prescribed vertical length and said actual length of said vertical component;

determining a number of bit positions to be stored in said map of bit positions in response to a display list input using a factor proportional to said vertical correction factor.

4. A method for correcting errors in horizontal and vertical scanning of a scanning printer as in claim 1 wherein said determining step scales said display list input by said horizontal correction factor and said vertical correction factor.

5. A method for correcting errors in horizontal scanning of a scanning printer as in claim 2 wherein said determining step scales said display list input by said horizontal correction factor.

6. A method for correcting errors in vertical scanning of a scanning printer as in claim 3 wherein said determining step scales said display list input by said vertical correction factor.

7. A method for correcting errors in horizontal and vertical scanning of a scanning printer as in claim 1 wherein said determining step changes the resolution of said controller.

8. A method for correcting errors in horizontal scanning of a scanning printer as in claim 2 wherein said determining step changes the resolution of said controller.

9. A method for correcting errors in vertical scanning of a scanning printer as in claim 3 wherein said determining step changes the resolution of said controller.

* * * * *